United States Patent [19]

Miyazawa et al.

[11] Patent Number: 4,809,091
[45] Date of Patent: Feb. 28, 1989

[54] DISK APPARATUS

[75] Inventors: Shyoichi Miyazawa; Satoshi Kawamura, both of Yokohama; Shoichiro Tohyama, Odawara; Akira Ishibashi, Tokyo; Kazutoshi Kato, Narashino; Junichi Ideda, Tokyo, all of Japan

[73] Assignees: Hitachi, Ltd.; Tokico Ltd., both of Tokyo, Japan

[21] Appl. No.: 38,837

[22] Filed: Apr. 15, 1987

[30] Foreign Application Priority Data

Apr. 16, 1986 [JP] Japan .................................. 61-85981
Jun. 20, 1986 [JP] Japan ................................ 61-143015
Dec. 10, 1986 [JP] Japan ................................ 61-292301

[51] Int. Cl.$^4$ ......................... G11B 5/09; G11B 15/04
[52] U.S. Cl. .......................................... 360/48; 360/60
[58] Field of Search ...................... 360/31, 61, 62, 63, 360/60, 72.2, 48, 66

[56] References Cited

U.S. PATENT DOCUMENTS 4,554,598 11/1985 Terbox et al. ........................ 360/48

Primary Examiner—Vincent P. Canney
Attorney, Agent, or Firm—Antonelli, Terry & Wands

[57] ABSTRACT

A disk drive system includes a magnetic disk apparatus which accurately positions read/write heads for reading data from and writing data on tracks on the data surface of a rotary disk on a predetermined track on the disk on the basis of servo data written in the servo area formed on the data surface, and a disk controller which controls the mode of operation of the disk apparatus. Index signals respectively indicating the start and end of the servo area are generated on the basis of the result of detection of the angular phase of the disk. The mode of operation of the magnetic disk apparatus is determined on the basis of a write control signal provided by the disk controller. The index signals respectively indicating the start and end of the servo area are sent to the disk controller when the mode of operation is track format write mode, while the index signal indicating the end of the servo area is sent to the disk controller when the mode of operation is other than the track format write mode.

17 Claims, 20 Drawing Sheets

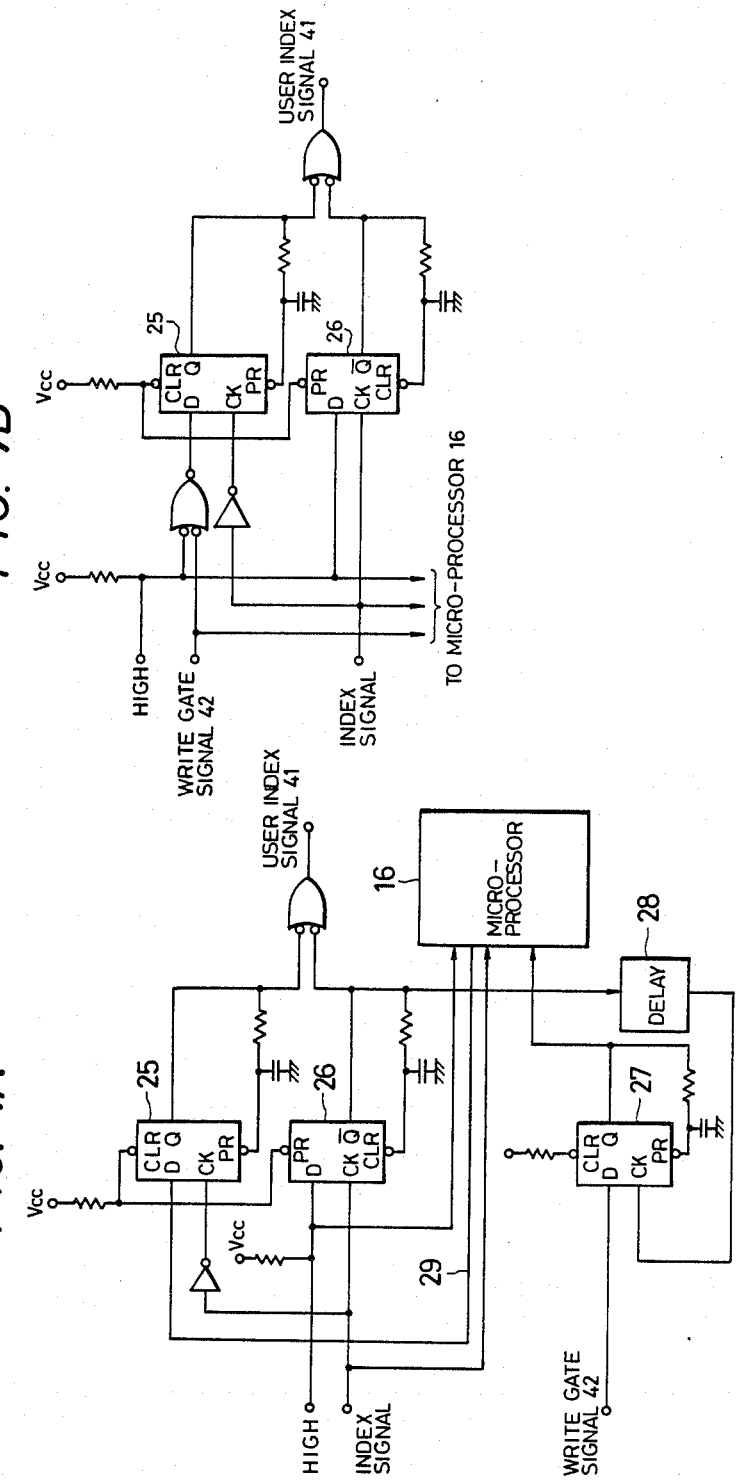
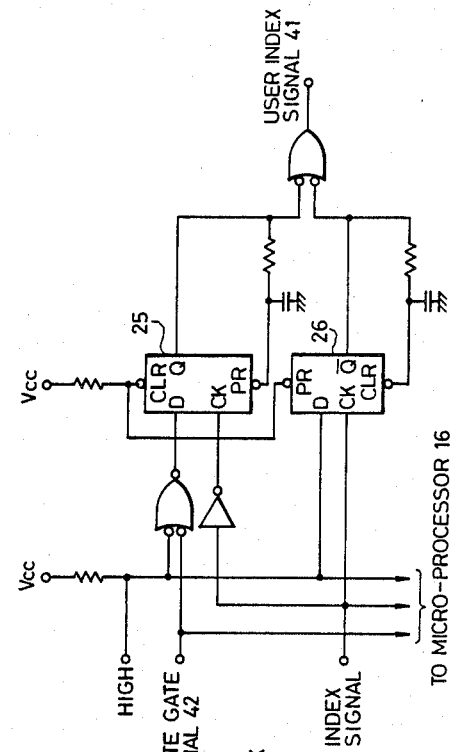
FIG. 7A
FIG. 7B

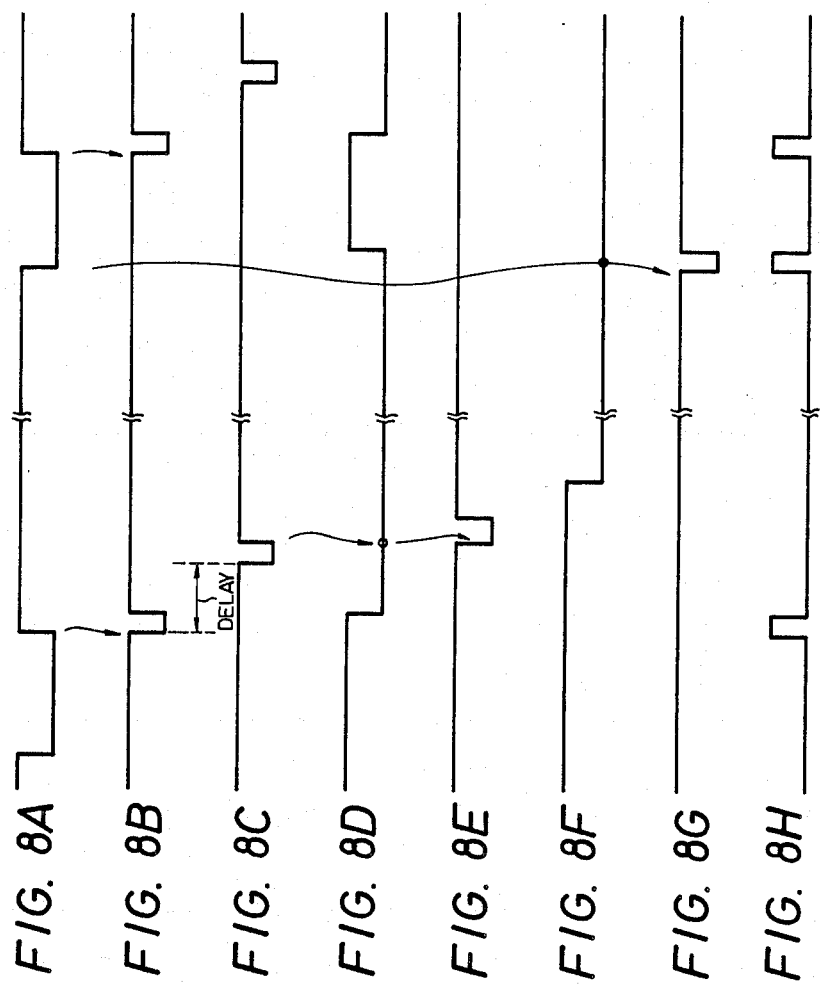

DISK APPARATUS

BACKGROUND OF THE INVENTION

The present invention relates to a disk apparatus of a data surface servo system for use in a disk drive system.

Disk drive systems in various servo systems, such as a magnetic disk drive system comprising a magnetic disk apparatus, a host computer, and a disk controller interconnecting the magnetic disk apparatus and the host computer, are known. A disk drive system in a data surface servo system is one of those known disk drive systems. According to such a data surface servo system, servo data is written in a servo area of a disk for entering data at least during every revolution of the disk. The servo data is used for producing control signals for controlling a positioning servomechanism for aligning a magnetic head with the center of the track.

In a data surface servo system as disclosed, for example, in U.S. Pat. No. 4,396,959, a detector, provided on a spindle motor for rotatively driving a disk, produces an index signal immediately before the servo area. Then, the index signal is applied to the servo controller of the magnetic disk apparatus to produce a write inhibit signal for masking a write gate signal applied by a disk controller to the magnetic disk apparatus during the write operation to protect servo data previously recorded on the data side of the disk. After being delayed by the servo controller, the index signal is applied to the disk controller for producing a write gate signal. Consequently, since the format write operation of the disk controller continues from the moment when the leading edge of the delayed index signal is detected to the moment when the leading edge of the next delayed index signal is detected, the operation of the disk controller is unavoidably inhibited from the end of writing the format on one track to the start of writing the next format, for a latency period corresponding to one revolution.

To eliminate such inconvenience, a write gate signal may be produced by applying to the disk controller index signals produced immediately before and immediately after the servo area, respectively, in the magnetic disk apparatus.

However, known disk controller are incapable of discriminating whether the index signals are those produced immediately before or immediately after the servo area. Accordingly, known disk controller are unable to be used for producing the write gate signal in such a manner. To provide known disk controllers with an index signal discriminating function, additional circuits in terms of gates, on the order of approximately 600 gates, need to be incorporated into the disk controller, which is a considerable increase in the circuitry.

Thus, a latency period corresponding to one revolution is indispensable in the known disk drive system as disclosed in U.S. Pat. No. 4,396,959 for a format data verify process or for a format write process for the next track, after the end of a format write process for the preceding track in the format mode, and hence the disk drive system requires considerable time for the format process. Even if the disk apparatus is constituted so as always to apply to the disk controller two index signals, immediately before and immediately after the servo area, still known disk controllers are unable to function without requiring a considerable increase in circuitry.

SUMMARY OF THE INVENTION

It is therefore a general object of the present invention to provide a disk drive system capable of reducing the time required for the format write process without requiring considerable modification of the disk controller.

Another object of the present invention is to provide a disk apparatus capable of independently establishing an operation mode on the basis of a control signal given thereto from a disk controller.

A further object of the present invention is to provide a magnetic disk drive system employing an existing disk controller and capable of greatly reducing the format write process time.

Still a further object of the present invention is to provide a magnetic disk apparatus capable of independently establishing an operation mode, such as a format write mode, on the basis of a write control signal given thereto from a disk controller.

To achieve the objects of the invention, a disk drive system according to the present invention has a disk apparatus capable of selecting a user index signal to be applied to a disk controller in accordance with the operation mode of the system. That is, in a format write mode, the disk apparatus applies signals respectively indicating the start and end of a servo area to the disk controller and, in a mode other than the format write mode, applies a signal indicating the end of a servo area to the disk controller.

The disk apparatus has an operation mode detecting means capable of independently detecting the operation mode of the system on the basis of a control signal given thereto from the disk controller and, upon the detection of the format write mode by the operation mode detecting means, the disk apparatus applies user index signals, namely, signals respectively indicating the start and the end of the servo area, to the disk controller. When the detected operation mode is not the format write mode, the disk apparatus applies a signal indicating the end of the servo area as a user index signal to the disk controller.

The operation mode detecting means receives a write gate signal, i.e., a data write control signal from the disk controller, and a servo area end signal, and then distinguishes the operation mode from a format write mode and other modes by determining the level of the write control signal a predetermined time after receiving the servo area end signal indicating the end of the servo area.

Thus, in the format write mode, the disk controller is able to receive a format write start signal and a format write end signal, indicating points of starting and ending format the write operation for one track, respectively, as user index signals from the disk apparatus to avoid abnormal writing in the servo area, and is also able to execute format write process for the next track without a latency period, so that the latency period is reduced greatly. In a mode other than the format write mode, the disk controller receives only the servo area end signal, indicating the end of the servo area, as a user index signal from the disk apparatus, and hence the disk controller is able to execute operation modes other than the format write mode without requiring considerable modification of the circuit thereof.

Furthermore, according to the present invention, the disk apparatus is provided additionally, to enable detection of abnormal writing in the servo area, with a write abnormal detecting means for detecting the level of the write control signal provided by the disk controller a predetermined time after the servo area start signal, indicating the start of the servo area, has been provided. The disk apparatus is provided further with a means for forcibly invalidating the write control signal upon the detection of the an abnormal write condition by the detecting means. Similarly, the disk apparatus is provided with a means for applying a write fault signal to the disk controller upon the detection of an abnormal write condition by the write abnormal detecting means.

Still further, the disk apparatus is provided with a signal generating means for generating a servo area start signal and a servo area end signal on the basis of the output signal of a phase detecting means for detecting the angular phase of the disk.

The present invention will be described hereinafter as applied to a magnetic disk apparatus by way of example, however, the present invention is not limited thereto in application, but the present invention is applicable also to other disk apparatus including an optical disk apparatus.

BRIEF DESCRIPTION OF THE DRAWINGS

FIGS. 7A and 7B are block diagrams showing circuitry of user index signal generating circuit 24 in the magnetic disk drive system of FIG. 6;

FIGS. 8A to 8H are waveform charts showing the respective waveforms of signals produced by components of the magnetic disk drive system of FIG. 6;

DETAILED DESCRIPTION OF THE PREFERRED EMBODIMENTS

Preferred embodiments of the present invention will be described hereinafter with reference to the accompanying drawings.

Figure 1:
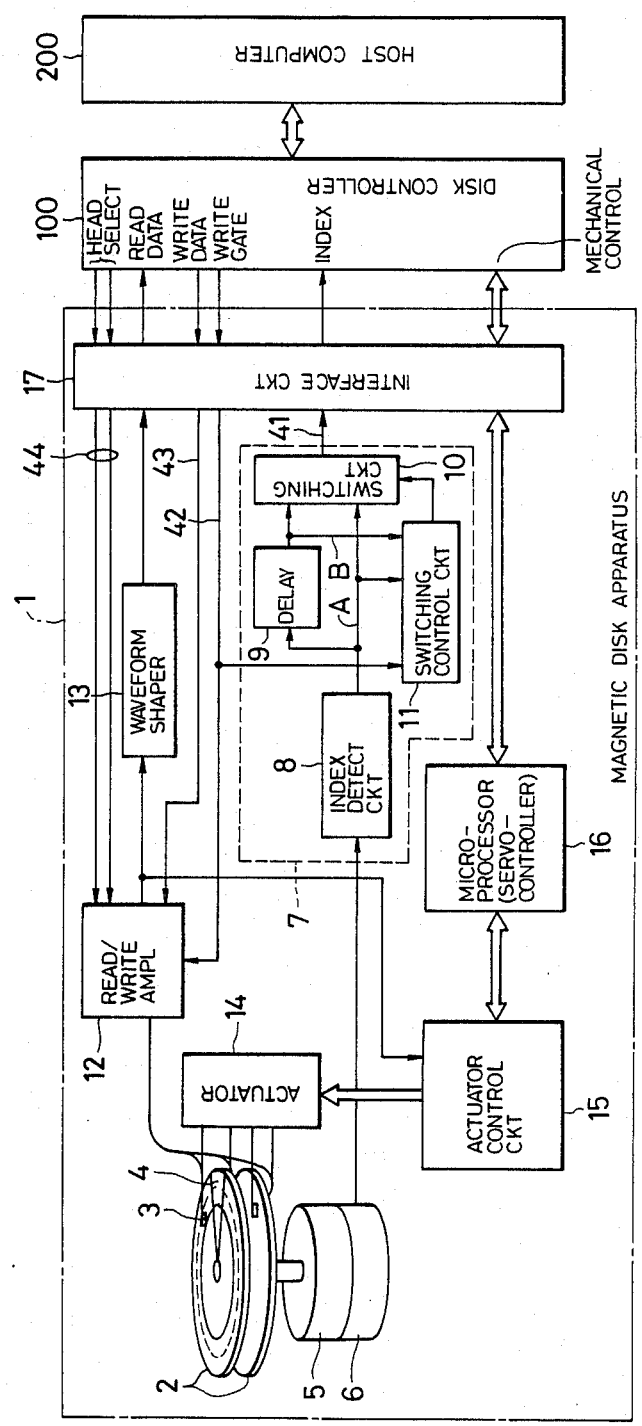
FIG. 1 is a block diagram showing a magnetic disk drive system including a magnetic disk apparatus, in a first embodiment, according to the present invention.

FIG. 1 shows the general constitution of a first embodiment of the present invention including a magnetic disk apparatus. The magnetic disk drive system comprises a magnetic disk apparatus 1, a disk controller 100 and a host computer 200. Enclosed by alternate long and short dash lines is the magnetic disk apparatus 1 which is provided with a plurality of data disks 2 and a read/write head 3 for reading data from and writing data on the data disks 2. At least one of the data disks 2 has servo areas 4 storing servo information. A spindle motor 5 for rotating the data disks 2 is provided with a position detector 6. In the first embodiment, the position detector 6 produces a pulse signal indicating the starting point of rotation of the data disks 2 or the servo data write starting point in writing servo data. That is, the position detector 6 produces index signals indicating the respective start positions of servo areas 4, respectively. The output signal of the position detector 6 is applied to a user index generator 7 enclosed by broken lines, which is one of the essential component of the magnetic disk drive system of the present invention. The user index producing circuit 7 has an index detect circuit 8 which produces a signal A indicating a position immediately before the servo area 4. The signal A is applied to a delay circuit 9, and then the delay circuit 9 produces a signal B indicating a position immediately behind the servo area 4. The two signals A and B are applied to a switching circuit 10. A switching control circuit 11 controls the switching circuit 10 to give either the signal A or the signal B as a user index signal 41 through an interface circuit 17 to the disk controller 100.

A write gate signal 42, to be transmitted through the interface circuit 17 to a read/write amplifier 12, is applied to the switching control circuit 11. The signals A and B are applied to the switching control circuit 11 in addition to the write gate signal 42. The switching control circuit 11 detects the start of a format write process of the disk controller 11 from the write gate signal 42 and the signal B. In a format write mode, the switching control circuit 11 controls the switching circuit 10 so that the signals A and B are applied through the interface circuit 17 to the disk controller 100 while, in modes other than the format write mode, the switching control circuit 11 controls the switching circuit 10 so that the signal B is applied as a user index signal 41 through the interface circuit 17 to the disk controller 100. In the first embodiment, the signal B, indicating a position behind the servo area, is transmitted as a user index signal from the magnetic disk apparatus 1 to the disk controller 100 in modes other than the format write mode, such as a data write mode and a data read mode, while the signal A indicating a position before the servo area is applied as a user index signal 41, in addition to the signal B, to the disk controller 100 in the format write mode.

Also shown in FIG. 1 are a waveform shaping circuit 13 for shaping the waveforms of data signals provided by the read/write amplifier 12, an actuator 14 for actuating the read/write head 3, an actuator drive circuit 15 for driving actuator 14, and a microprocessor 16 serving as a servo controller, which are substantially the same in circuit constitution as the corresponding conventional circuit elements.

The manner of operation of the first embodiment shown in FIG. 1 will be described hereinafter with reference to FIGS. 2 and 3A to 3H.

Figure 2:
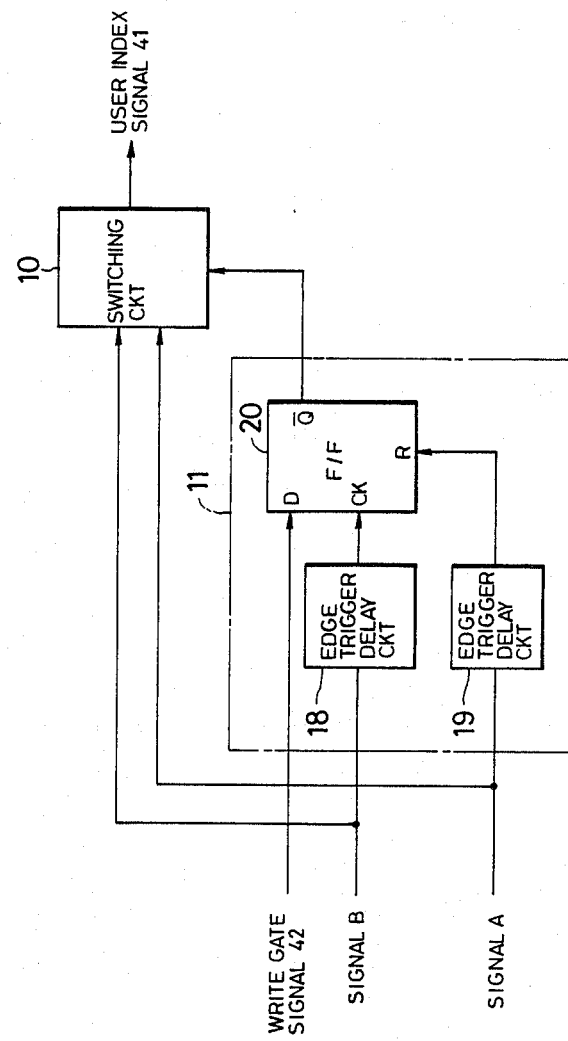
FIG. 2 is a block diagram showing the circuitry of switching control circuit 11 in the magnetic disk drive system of FIG. 1.

Referring to FIG. 2, the switching control circuit 11 comprises an edge trigger delay circuit 18 which produces a pulse of a fixed pulse width upon the reception of the signal B at a point corresponding to the leading edge of the signal B, an edge trigger delay circuit 19 which produces a pulse of a fixed width upon the reception of the signal A at a point corresponding to the trailing edge of the signal A, and a flip-flop circuit 20. Upon the reception of the signal B, the edge trigger delay circuit 18 produces a pulse of a fixed pulse width to convert the condition of the flip-flop circuit 20 at the trailing edge of the pulse so that the flip-flop circuit 20 samples and stores a write gate signal 42 provided by the disk controller 100. When the disk controller 100 is in the format write mode, the write gate signal 42 becomes active (low) before the trailing edge of the pulse provided by the edge trigger delay circuit 18. The flip-flop circuit 20 comes to a state corresponding to the high write gate signal 42 and provides a high $\overline{Q}$ output. When the flip-flop circuit 20 provides the high $\overline{Q}$ output, the switching circuit 10 selects signal A as the user index signal 41 and, when a low $\overline{Q}$ output, selects signal B as the user index signal 41. Accordingly, in the format write mode, the switching circuit 10 applies the signal A as the user index signal 41, in addition to the signal B, to the disk controller 100.

On other hand, upon reception of the signal A, the edge trigger delay circuit 19 produces a pulse of a fixed pulse width at a point corresponding to the trailing edge of the signal A. The pulse produced by edge trigger delay circuit 19 is applied to the reset input terminal R of the flip-flop circuit 20 to reset the flip-flop circuit 20. Then, the flip-flop circuit 20 provides a $\overline{Q}$ output signal to change the switching condition of the switching circuit 10 from a condition selecting signal A to a condition selecting signal B.

FIGS. 3A to 3H are waveforms of signals provided by the essential components of the first embodiment in the format write mode.

Figure 3:
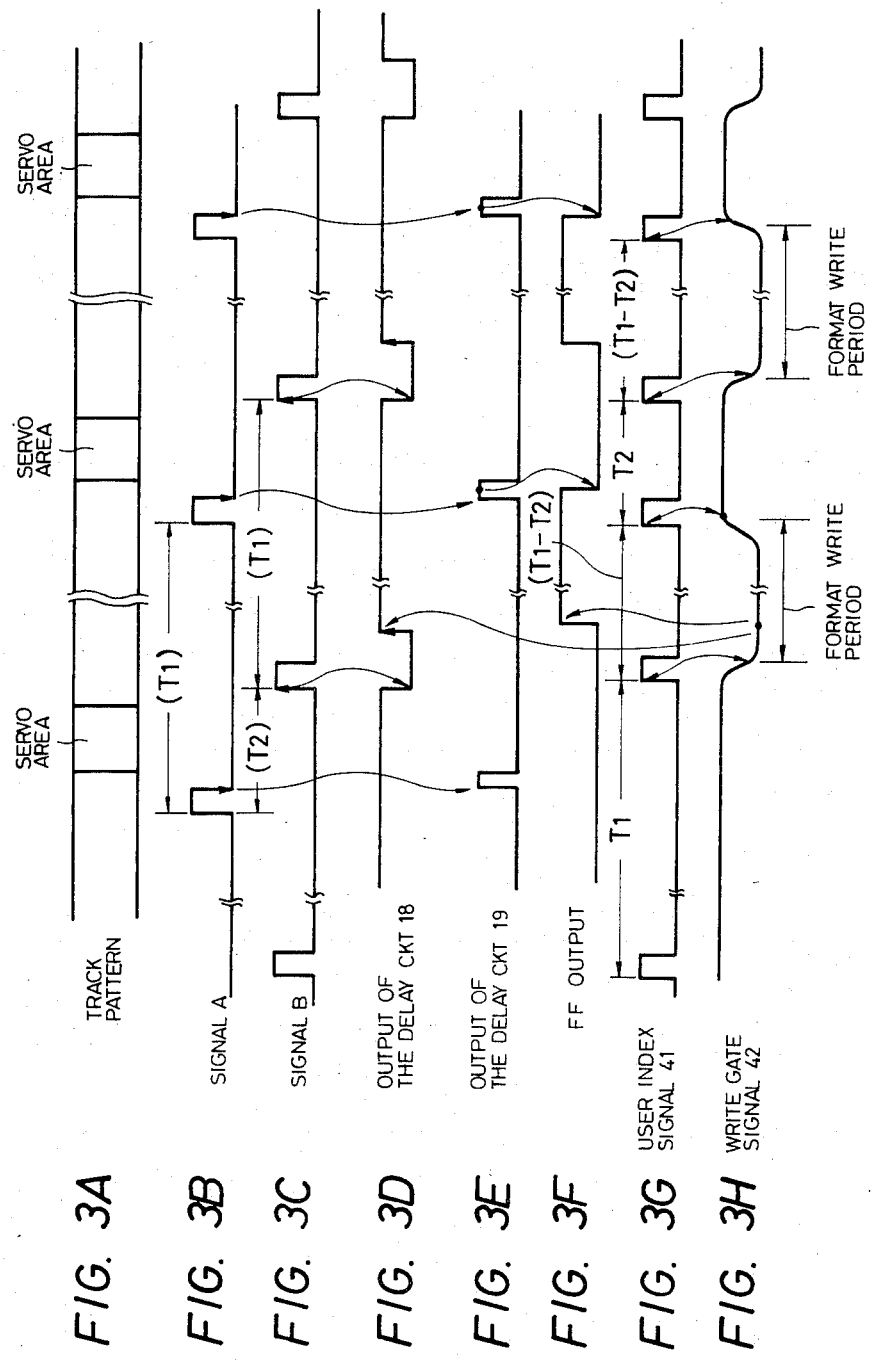
FIGS. 3A to 3H are waveform charts showing the respective waveforms of signals produced by components of the magnetic disk drive system of FIG. 1.

FIG. 3A typically shows a track pattern on a data disk 2; FIGS. 3B and 3C show the respective waveforms of the signals A and B, respectively; FIGS. 3D and 3E show the respective waveforms of the output signals of the edge trigger delay circuits 18 and 19, respectively; FIG. 3F shows the waveform of the output $\overline{Q}$ of the flip-flop circuit 20; FIG. 3G shows the waveform of the user index signal 41 from switching circuit 10; FIG. 3H shows the waveform of the write gate signal 42 produced by the disk controller 100 on the basis of the user index signal 41. The switching circuit 10 selects the signal B when the output $\overline{Q}$ of low-level is provided, and selects the signal A when the output $\overline{Q}$ of high-level is provided.

As is obvious from FIGS. 3A to 3H, each servo area 4 on the data disk 2 lies between the signal A and the signal B in respect of time, while the period of the format write process extends from the signal B to the signal A, as is apparent from the write gate signal 42, in which nothing is written during the servo area 4 on the data disk 2, so that the servo data is protected.

FIGS. 4A to 4F show the essential portions of the waveforms shown in FIGS. 3A to 3H relating to the format write mode start section.

Figure 4:
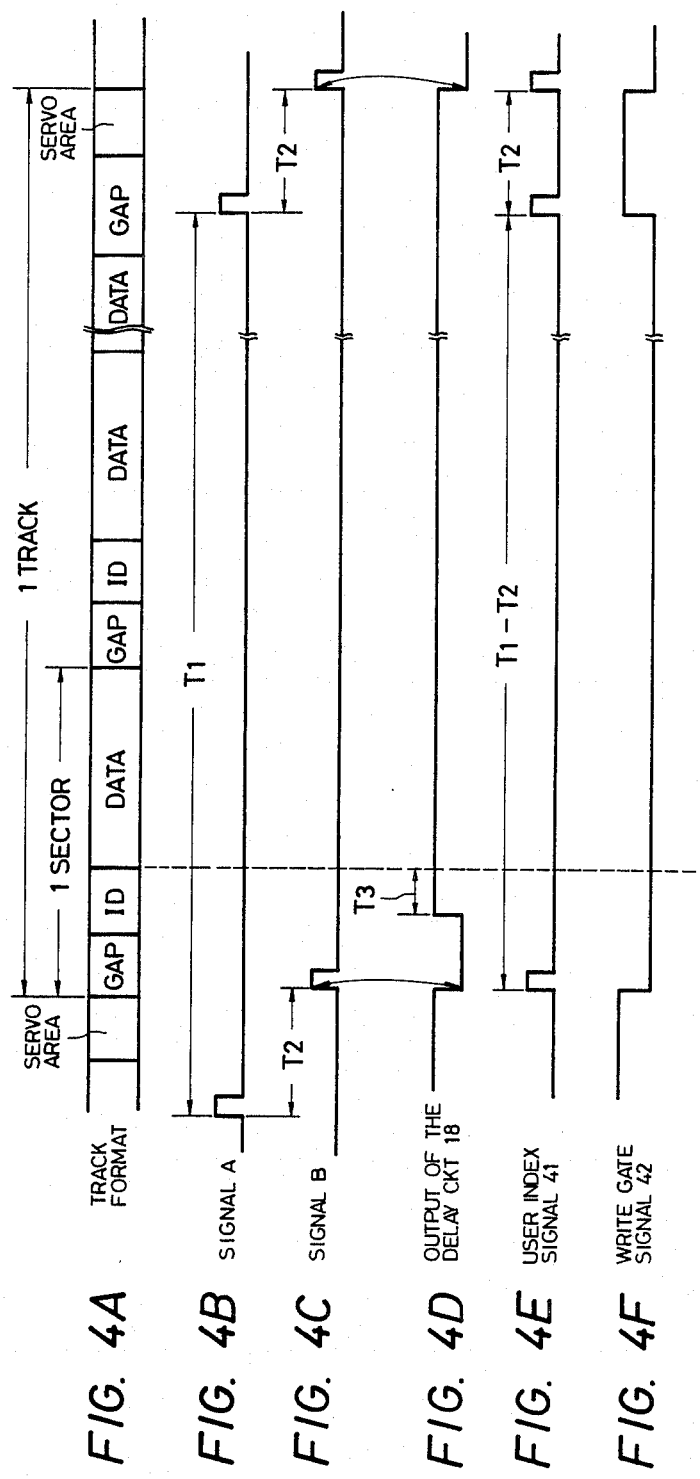
FIGS. 4A to 4F are partially enlarged waveform charts showing the respective essential portions of some of the signals among the signals shown in FIGS. 3A to 3H.

Referring to FIG. 4A, showing the track format of the data disk 2, each track has a plurality of sectors, for example, thirty-two sectors or sixty-four sectors, each comprising a gap area GAP, an ID area ID and a data area DATA. The output signal of the edge trigger delay circuit 18 starts rising immediately before, namely, a time interval $T_3$ before, the data area of the first sector of each track. Therefore, it is possible to distinguish the write process of the disk controller 100 from a format write process and a data write process, because the write gate signal 42 is high, the Q output of the flip-flop circuit 20 is low and the switching circuit 10 is a condition for selecting the signal B at a point corresponding to the leading edge of the output signal of the edge trigger delay circuit 18 in the data write mode.

Figure 5:
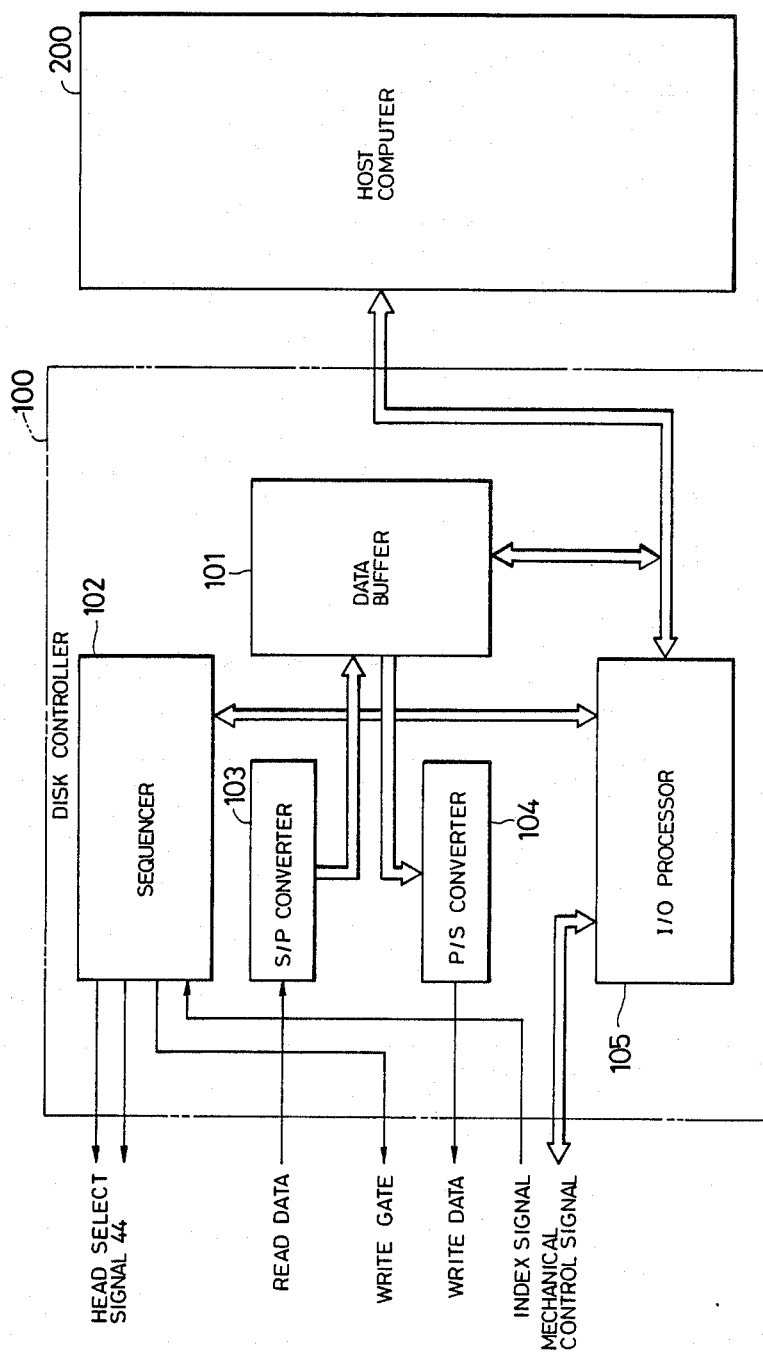
FIG. 5 is a block diagram showing circuitry of disk controller 100 in the magnetic disk drive system of FIG. 1.

Shown in FIG. 5, showing the general constitution of the disk controller 100 of FIG. 1, are a data buffer 101, a sequencer 102, a serial-parallel converter 103, a parallel-serial converter 104, and an I/O processor 105. The data buffer 101 stores format information for a plurality of tracks or enables simultaneous data transfer between the magnetic disk apparatus 1 and the disk controller 100 and data transfer between the disk controller 100 and the host computer 200. Therefore, format information for the next track has been stored in the data buffer 101 before the end of a format write process for writing format information in the preceding track. Accordingly, when the head select signals 44 of the sequencer 102 are changed in a time interval $T_2$ between the signal A and the signal B to subject another data surface of the same cylinder to a formatting process, the disk controller 100 is able to execute a formatting process for formatting a track on another data surface immediately after ending formatting of the track on the preceding data surface.

A magnetic disk drive system, in a second embodiment, according to the present invention will be described hereinafter with reference to FIGS. 6 to 11.

Figure 6:
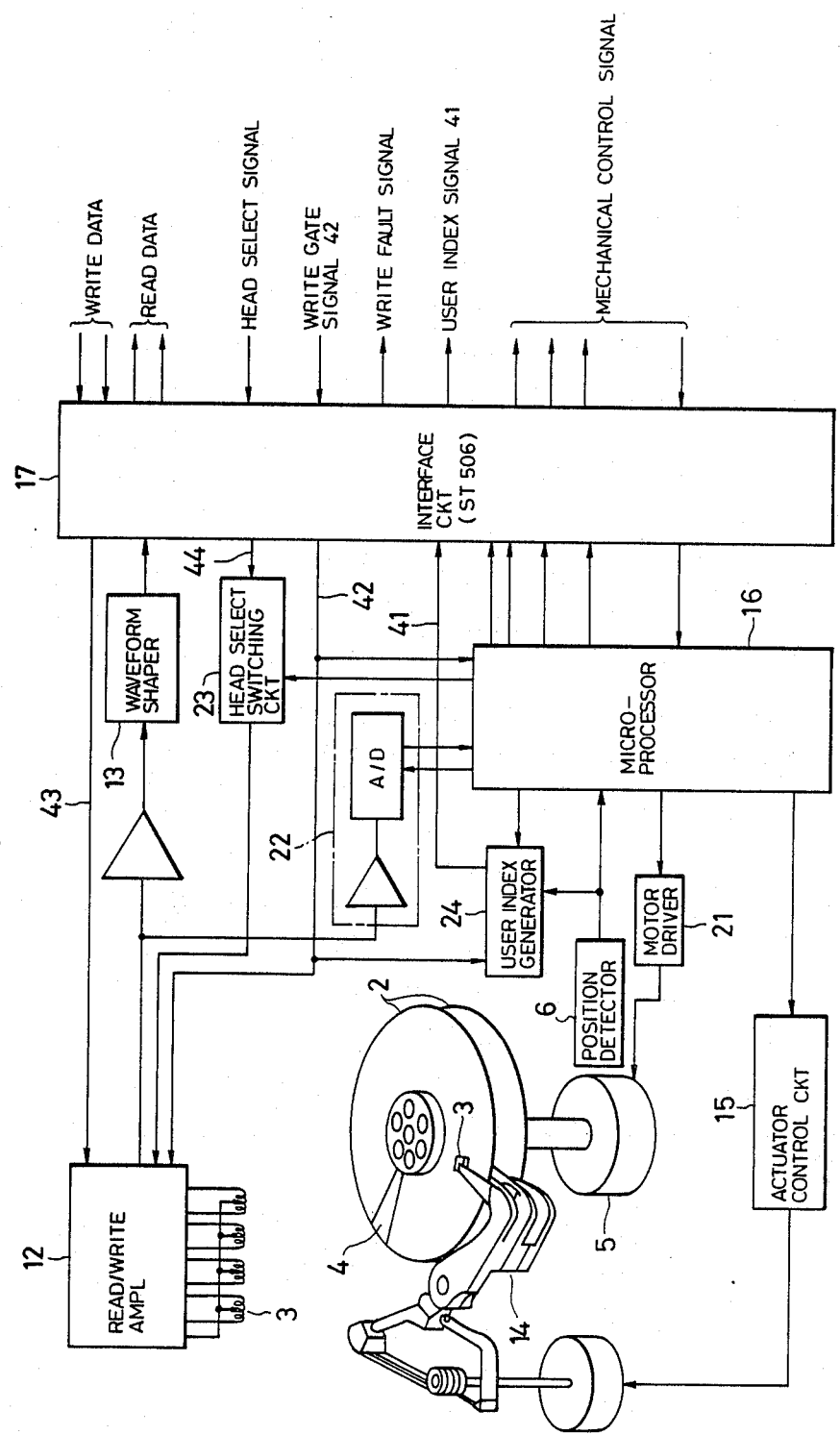
FIG. 6 is a block diagram showing a magnetic disk drive system, in a second embodiment, according to the present invention.

FIG. 6, similarly to FIG. 1, shows the constitution of a magnetic disk apparatus including an interface circuit 17. Basically, the magnetic disk apparatus shown in FIG. 6 and that shown in FIG. 1 are the same in constitution. In FIG. 6, parts similar or corresponding to those described with reference to FIG. 1 are denoted by the same reference numerals. FIG. 6 includes a motor driver 21, an offset detector 22 and a head selector circuit 23, which are not shown in FIG. 1. The embodiment of FIG. 6 employs a user index generator 24 which is different from that of the first embodiment.

The offset detector 22 comprises an amplifier and an AD converter. The offset detector 22 is the same in constitution as the conventional offset detector. The offset detector 22 gives an offset value for servo to a microprocessor 16. The second embodiment employs ST506 (Shugart) as an interface circuit 17. When servo areas 4 are formed only on the uppermost data surface among the four data surfaces of two data disks 2 and four heads 3 are provided as shown in FIG. 6, the head selector circuit 23 selects the uppermost head 3 compulsorily to read servo data from the servo area 4 regardless of the selection of any other head 3 among the rest of the heads 3. The head selector circuit 23 is controlled by a signal from the microprocessor 16. Such a circuit constitution is the same as that of the corresponding conventional circuit.

The user index generator 24 employed in the second embodiment is different from the user index generator 7 employed in the first embodiment. A magnet buried in a rotary member of a spindle motor 5 in the second embodiment is different in width from that employed in the first embodiment, and the time when a position detector 6 provides an output signal coincides with the time when the servo area 4 passes below the head 3. Accordingly, upon the passage of the magnet by the position detector 6, the level of the index signal changes from high to low. Upon the detection of the leading edge of the index signal, the user index generator 24 provides a user index signal 41. The user index generator 24 provides the user index signal 41 also when the leading edge of the index signal is detected and a write gate signal 42 is low at the moment when the trailing edge of the index signal is detected. While the write gate signal is low, the head 3 is able to write in the data surface. In the second embodiment, in particular, the write gate signal 42 is low at a moment corresponding to the trailing edge of the index signal only in the format write mode.

FIG. 7A shows an embodiment of the user index generator 24 and FIGS. 8A to 8H are the respective waveforms of signals produced by the essential components of the user index generator 24. Shown in FIG. 7A are flip-flop circuits 25, 26 and 27, and a delay circuit 28. The flip-flop circuit 26 produces a negative pulse at the output terminal $\overline{Q}$ at the moment corresponding to the trailing edge of the index signal provided by the position detector 6. An RC circuit connected across the $\overline{Q}$ output terminal and the clear terminal CLR of the flip-flop circuit 26 determines the pulse width of the negative pulse. FIGS. 8A and 8B show the respective waveforms of the index signal and the output signal at the $\overline{Q}$ output terminal, respectively. The delay circuit 28 delays the $\overline{Q}$ output signal by a fixed time to provide a negative pulse shown in FIG. 8C. A write gate signal shown in FIG. 8D is applied to the terminal D of the flip-flop circuit 27. When the negative pulse provided by the delay circuit 28 is applied to the terminal CK of the flip-flop circuit 27, the flip-flop circuit 27 provides an output signal corresponding to the level of the write gate signal 42 through the Q output terminal thereof. As illustrated in FIG. 8D, since the write gate signal 42 corresponding to the format write mode is produced by a disk controller 100, the write gate signal 42 is low in the gap area, in which the delay circuit 28 produces the negative pulse, following the servo area 4, and the flip-flop circuit 27 provides a negative pulse as shown in FIG. 8E through the Q output terminal.

The microprocessor 16 for servo receives the index signal and the output signal of the flip-flop circuit 27 provided through the output terminal Q, and then, after a predetermined time, produces a signal 29 shown in FIG. 8F. The signal 29 is used for providing the user index signal even at a moment corresponding to the trailing edge of the index signal in the format write mode. That is, the signal 29 is applied to the terminal D of the flip-flop circuit 25. After the level of the signal 29 has changed from high-level to low-level, the signal 29 is used for providing a negative pulse shown in FIG. 8G through the Q output terminal of the flip-flop circuit 25. Consequently, the same user index signal 41 shown in FIG. 8H as that of the first embodiment is produced.

In a mode other than the format write mode, since the write gate signal shown in FIG. 8D has not become low, where writing data on the data surface is possible before the negative pulse is provided by the delay circuit 28, the signal from the Q output terminal of the flip-flop circuit 27 to the microprocessor 16 is never a negative pulse, and hence the the microprocessor 16 continues providing the high signal 29. Accordingly, the flip-flop circuit 25 does not produce any negative pulse, and hence only a negative pulse is provided as the user index signal to the disk controller 100 at the time corresponding to the leading edge of the index signal.

The microprocessor 16 changes the level of the signal 29 from high to low by changing the level of the signal applied to the terminal D of the flip-flop circuit 26. Accordingly, the flip-flop circuit 25 generates a negative pulse every reception of the index signal at a moment corresponding to the trailing edge of the index signal. On the other hand, since the terminal D of the flip-flop circuit 26 is always low, the flip-flop circuit 26 does not generate any negative pulse at a moment corresponding to the leading edge of the index signal. In such a case, the disk controller 100 uses the user index signal 41 for writing servo data.

FIG. 7B, similarly to FIG. 7A, illustrates another embodiment of the user index generator 24. In FIG. 7B, blocks similar to or corresponding to those previously described with reference to FIG. 7A are denoted by the same reference numerals. The user index generator 24 shown in FIG. 7B also provides a user index signal 41 only at a moment corresponding to the leading edge of an index signal in the ordinary write mode. In the format write mode the user index generator 24 provides the user index signal 41 also at a moment corresponding to the trailing edge of the index signal.

In the format write mode, a write gate signal 42 is low after the first user index signal 41 has been provided. Accordingly, the input terminal D of flip-flop circuit 25 is low at the moment corresponding to the trailing edge of the index signal and hence the flip-flop circuit 25 generates a negative pulse at that moment. The pulse width of the negative pulse is dependent on the characteristics of a RC circuit connected across the Q output terminal and the preset terminal of the flip-flop circuit 25. The negative pulse is given as the user index signal 41 through a NOR circuit to the disk controller 100. A signal applied to the input terminal D of a flip-flop circuit 26 at the moment corresponding to the leading edge of the index signal is inverted and provides an inverted signal, namely, a negative pulse, through the output terminal Q. The negative pulse is given as the user index signal 41 through the NOR circuit to the disk controller 100.

Since the write gate signal is high in the ordinary write mode, the output of the flip-flop circuit 25, similarly to that in the foregoing embodiment, does not change at a moment corresponding to the trailing edge of the index signal even when the index signal is applied to the flip-flop circuit 25.

Figure 9:
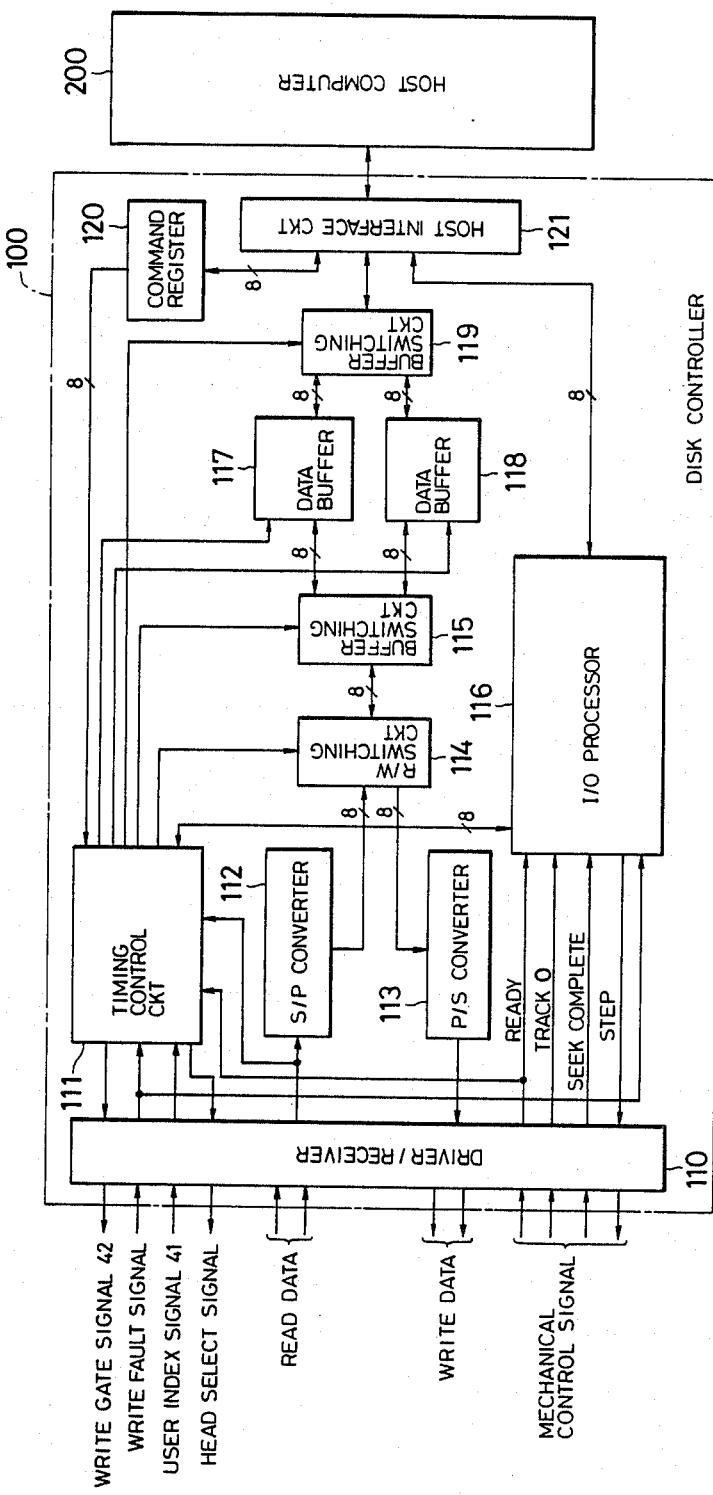
FIG. 9 is a block diagram showing circuitry of disk controller in the magnetic disk drive system of FIG. 6.
Figure 10:
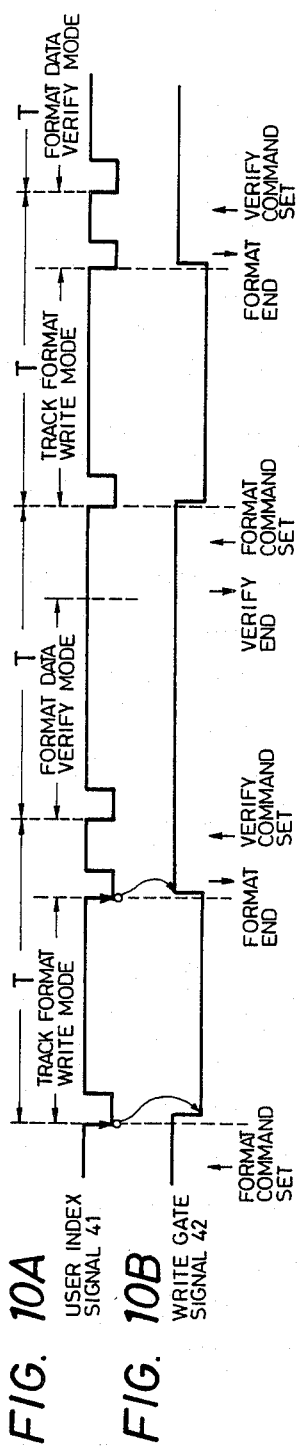
FIGS. 10A and 10B are diagrams showing the operation mode and the waveforms of signals produced by components of the magnetic disk drive system of FIG. 6.

The magnetic disk apparatus shown in FIG. 6, similarly to that of the first embodiment, is connected through the interface circuit 17 thereof to the disk controller. FIG. 9 illustrates a concrete form of the disk controller employed in the second embodiment. In FIG. 9, indicated at 110 is a driver/receiver incorporated into the disk controller. The driver/receiver 110 exchanges many signals with the interface circuit 17, however, only signals relating to the present invention are shown in FIG. 9. The user index signal 41 is transmitted through the driver/receiver 110 to a timing control circuit 111. The timing control circuit 111 comprises, for example, a program logic array (PLA) or a plurality of counters. The timing control circuit 111 is substantially the same in function as the sequencer 102 of the first embodiment shown in FIG. 5. The timing control circuit 111 receives the user index signal and generates a write gate signal 42.

Also shown in FIG. 9 are a S/P converter 112 (serial-parallel converter) and a P/S converter 113 (parallel-serial converter) for converting read data and write data, respectively, a R/W switching circuit 114 (read/write switching circuit) and a buffer switching circuit 115, which are controlled by control signals given thereto from the timing control circuit 111 so as to switch read/write, and two buffers comprising a first data buffer 117 and a second data buffer 118, respectively, an I/O processor 116 comprising a microcomputer and memories, a buffer selector circuit 119 which is controlled by control signals given thereto from the timing control circuit 111, a command register 120 which stores commands given thereto from a host computer 200, and an interface circuit 121 interconnecting the host computer 200 and the disk controller.

The disk controller is the same as the conventional disk controller in constitution. A format write command given by the host computer 200 is registered in the command register 120, and then the timing control circuit 111 operates in accordance with the format write command. As mentioned above, upon the reception of the user index signal 41, the timing control circuit 111 changes the level of the write gate signal 42 to low and starts the format writing operation and, upon the reception of the next user index signal 41, the timing control circuit 111 changes the level of the write gate signal 42 to high to complete the format writing operation for one track. Thus, one track in the data surface is formatted. During the format writing operation, format data supplied from the two buffers through the P/S converter 113 is written in the track, in which the servo data written in the servo area 4 is protected and hence the servo data will, as a rule, be never destroyed.

Figure 11:
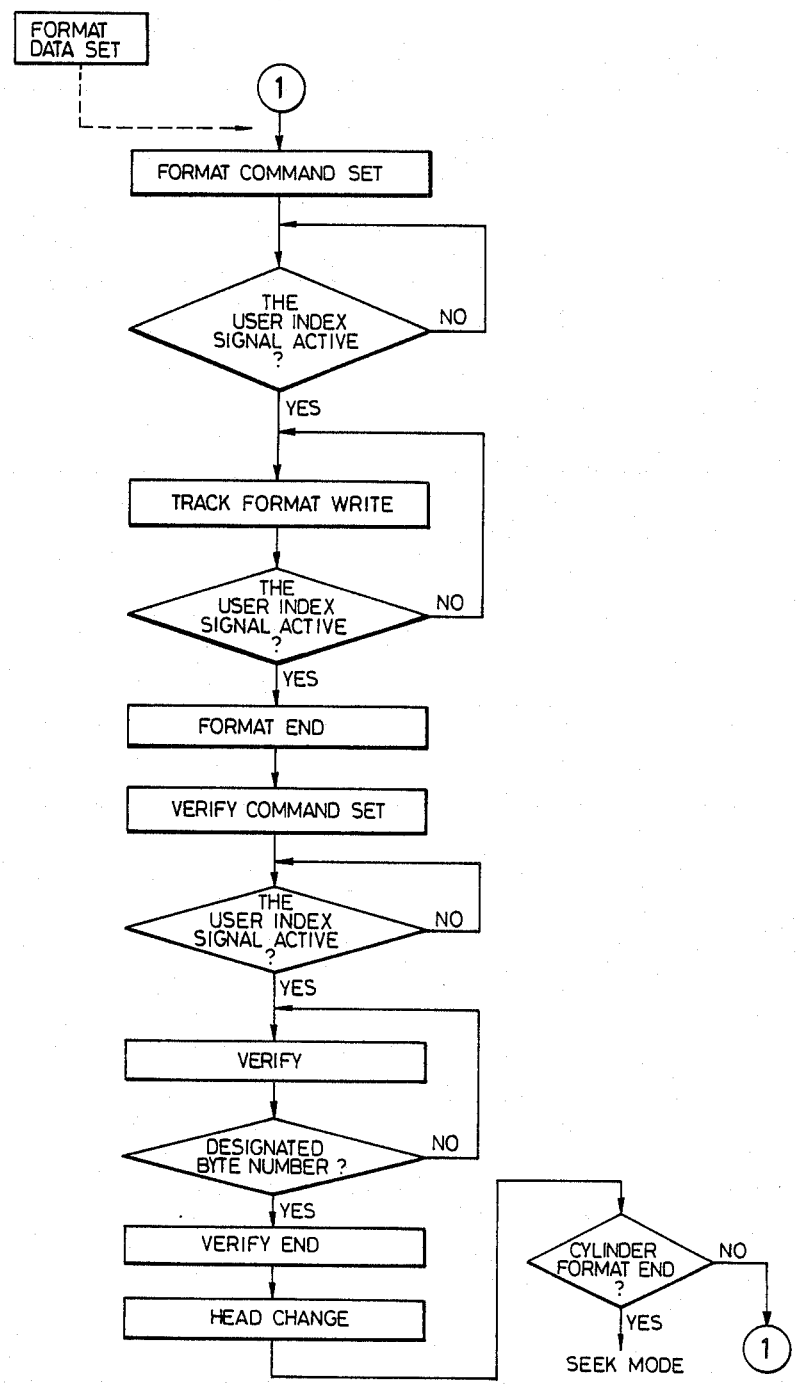
FIG. 11 is a flow chart showing the general operation of the magnetic disk drive system of FIG. 6.

Although not described in detail with reference to the first embodiment, it is usual to verify the recorded format write data after every formatting of one track, before formatting another track. FIGS. 10A and 10B are timing charts illustrating the mode of such verification and FIG. 11 is a flow chart showing the manner of the verification. FIG. 10A shows the user index signal 41 which is transferred from the magnetic disk apparatus to the disk controller, and FIG. 10B shows the write gate signal 42 which is generated by the timing control circuit 111 according to each mode on the basis of the user index signal 41. In the format write mode, the level of the write gate signal 42 is changed to low by the first user index signal 41, and then the level of the write gate signal 42 is changed to high by the successive user index signal 41. However, in the verify mode, the level of the write gate signal 42 is not changed.

Referring to FIG. 11, the host computer 200 gives format information (ID information) for one track to the buffer 117, and then gives a format command to the command register 120. The timing control circuit 111 executes format write operation in accordance with the format command. In the format write operation, first a decision is made as to whether or not the user index signal 41 is active (a negative pulse). When the user index signal 41 is active, track formating process, namely, writing the format information stored in the buffer 117 in the track, is started and the track formating process is continued until the next user index signal 41 provides a negative pulse. The track formating mode is ended when the user index signal 41 becomes active again.

After the track formating process has been completed, the host computer 200 gives a verify command to the command register 120. The timing control circuit 111 make a decision in response to the verify command as to whether or not the user index signal 41 is active. When the user index signal 41 is active, the timing control circuit 111 reads the format information stored in the data buffer 117 and the format information written in the data surface to check the exactness of the latter by comparison with the former. After starting the verification process, the timing control circuit 111 checks whether or not the collation of all the bytes of a designated number set as a command parameter have been completed and, when the collation is completed, executes verification ending process.

Thus, the format writing process for one track and the verification of the written format data are completed. Then, the timing control circuit 111 gives a head selection signal designating a head to the magnetic disk apparatus, and then the format write mode and the verify mode are repeated for the next track using the data stored in the data buffer 118. After format writing operation for the cylinder, namely, four data surfaces in the case of FIG. 6, has been completed, a seek operation for the next cylinder is started. In the write data mode, the timing control circuit 111 writes optional data at a predetermined position on the track with reference to a specific synchronous data (SYNC) through the format write mode without referring to user index signal 41, which is not directly related to the present invention and hence the detailed description thereof will be omitted.

Although the second embodiment has been described on an assumption that the servo data is recorded only in the servo area 4 on the uppermost data surface, the servo data may be recorded on any data surface or on a plurality of data surfaces. Generally, when the servo data is recorded on a plurality of data surfaces, the servo data recorded on the data surface nearest to the accessed data surface is read.

In the second embodiment, the disk controller uses the user index signal provided by the magnetic disk apparatus as both a format write start signal and a format write end signal. Accordingly, the disk controller receives the user index signal at the end of the servo area 4, which corresponds to the signal B, as the format write start signal, and receives the additional user index signal at the start of the servo area 4, which corresponds to the signal A, as the track end signal. Therefore, the write gate is closed immediately before the servo data and hence the servo data is never destroyed.

However, it is possible that the level of the write gate signal 42 is not changed from low to high due to a malfunction of the timing control circuit 111 of the disk controller 100, notwithstanding the magnetic disk apparatus 1 has detected the duration of the format write operation and has provided an additional user index signal. A third embodiment of the present invention is capable of detecting the malfunction of the disk controller 100 for the further protection of the servo data.

Figure 12:
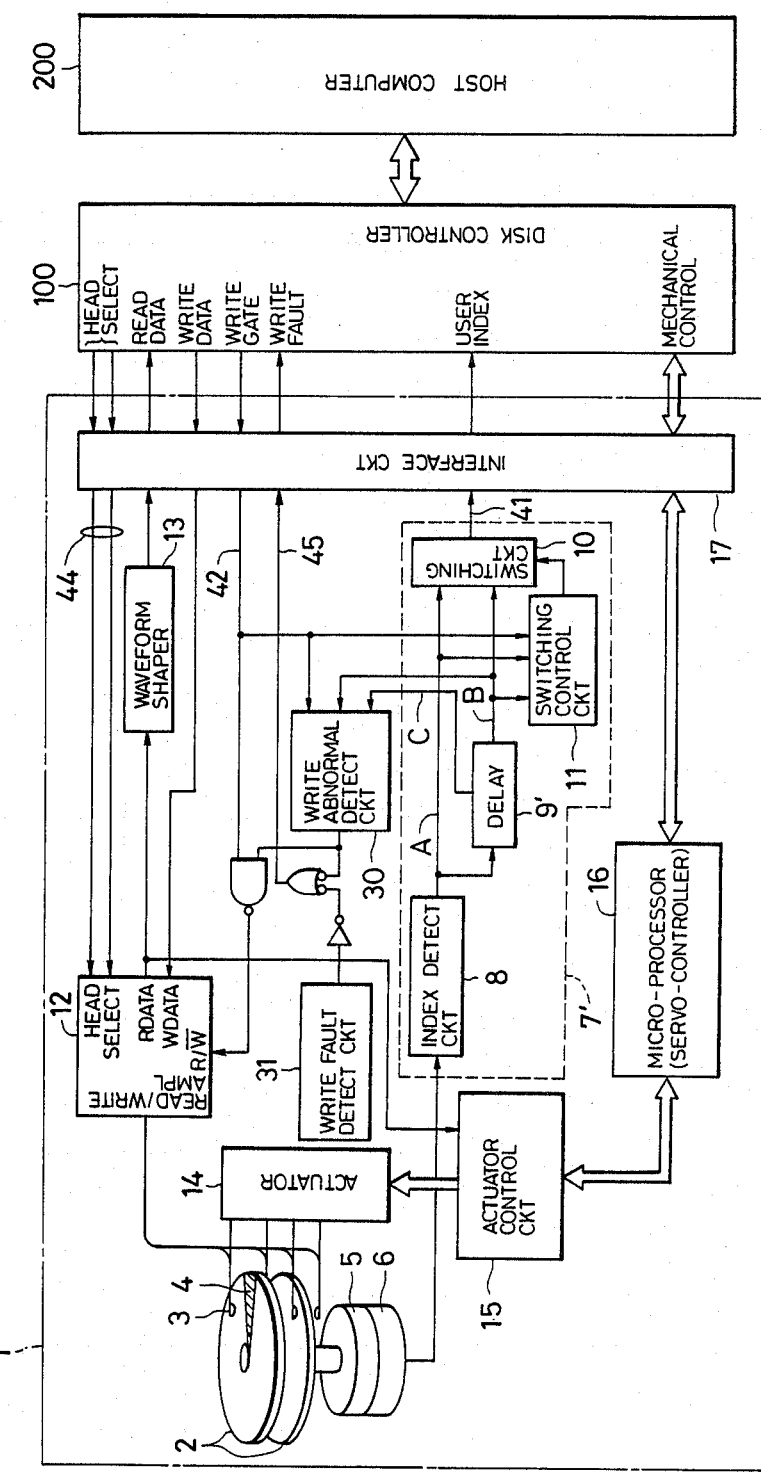
FIG. 12 is a block diagram showing circuitry a magnetic disk drive system including a magnetic disk apparatus, in a third embodiment, according to the present invention.

FIG. 12 illustrates the third embodiment of the present invention, in which the same parts as those previously described with reference to FIG. 1 are denoted by the same reference numerals. The third embodiment comprises a write abnormal detect circuit (WADC) 30 in addition to the arrangement of the first embodiment. When disk controller 100 starts an abnormal write operation, the WADC 30 incorporated into a magnetic disk apparatus 1' detects the malfunction of the disk controller 100, then invalidates the write gate signal 42 provided by the disk controller 100 for that moment to protect the servo data, and then inform the disk controller 100 of the abnormal write operation. Indicated at 31 is a conventional write fault detect circuit which is not included in the first embodiment. When the ST506 is employed as an interface circuit 17 as in the second embodiment, the write fault detect circuit 31 is included in the interface circuit 17. Generally, the write fault detect circuit 31 detects three faults, namely, power failure in the magnetic disk apparatus, head malfunction and execution of write operation during seek. However, the write fault detect circuit 31 is unable to detect overwrite attributable to malfunction of the disk controller.

A user index generating circuit 7', similarly to that of the first embodiment, generates a signal A and a signal B according to the mode of operation as the user index signal 41. The user index generating circuit 7' further generates a signal C after the signal A and before the signal B, which can be easily achieved by means of a delay circuit 9' included in the user index signal generating circuit 7'. That is, the delay circuit 9' produces the signal C from the signal A at a moment after the starting point of the servo area 4 and before the starting point of the servo data included in the servo area 4, in addition to the signal B.

Figure 13:
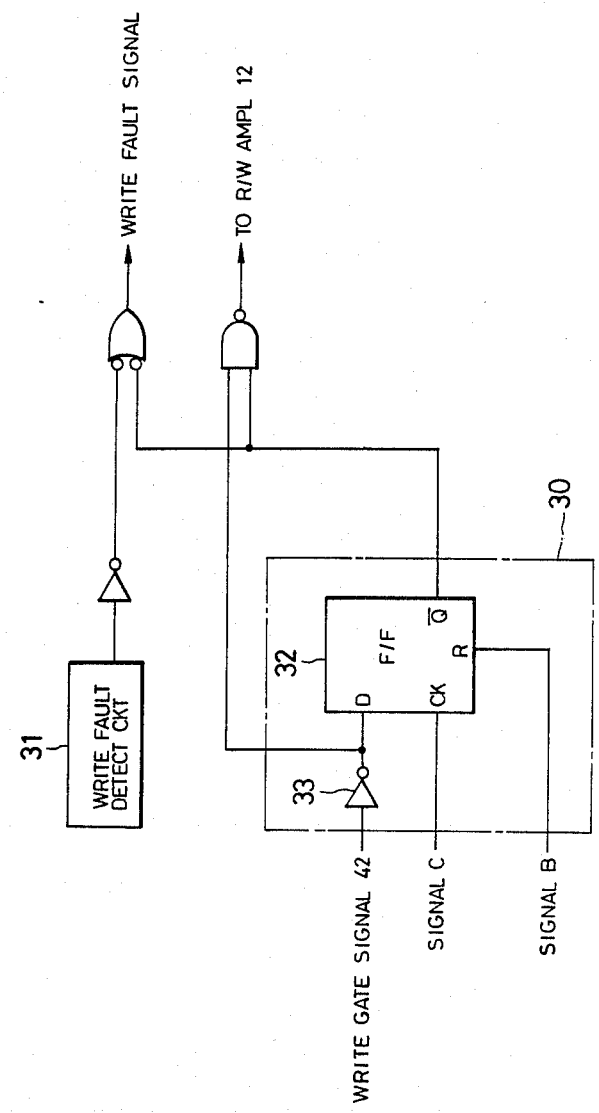
FIG. 13 is a block diagram showing a write abnormal detect circuit employed in the magnetic disk drive system of FIG. 12.

FIG. 13 illustrates a configuration, by way of example, of the WADC 30. The WADC 30 comprises a flip-flop circuit 32 and an inverter 33. The WADC 30 receives the signal B and the signal C from the delay circuit 9' and samples the write gate signal 42 provided by a disk controller 100 at the leading edge of the signal C. The continuous write operation of the disk controller 100 until the signal C becomes active is regarded as write abnormal, and then the flip-flop circuit 32 provides a $\overline{Q}$ output to cut off the write gate signal 42 of the disk controller forcibly for servo data protection. That is, the write gate signal 42 to be transferred to a read/write amplifier 12, and the $\overline{Q}$ output are applied to an AND circuit with an inversion output, and then the output of the AND circuit is applied to the R/W control terminal of the read/write amplifier 12. Further, the $\overline{Q}$ output is sent as a write fault signal together with the output of the conventional write fault detect circuit 31 through the disk controller 100 to a host computer 200.

Figure 14:
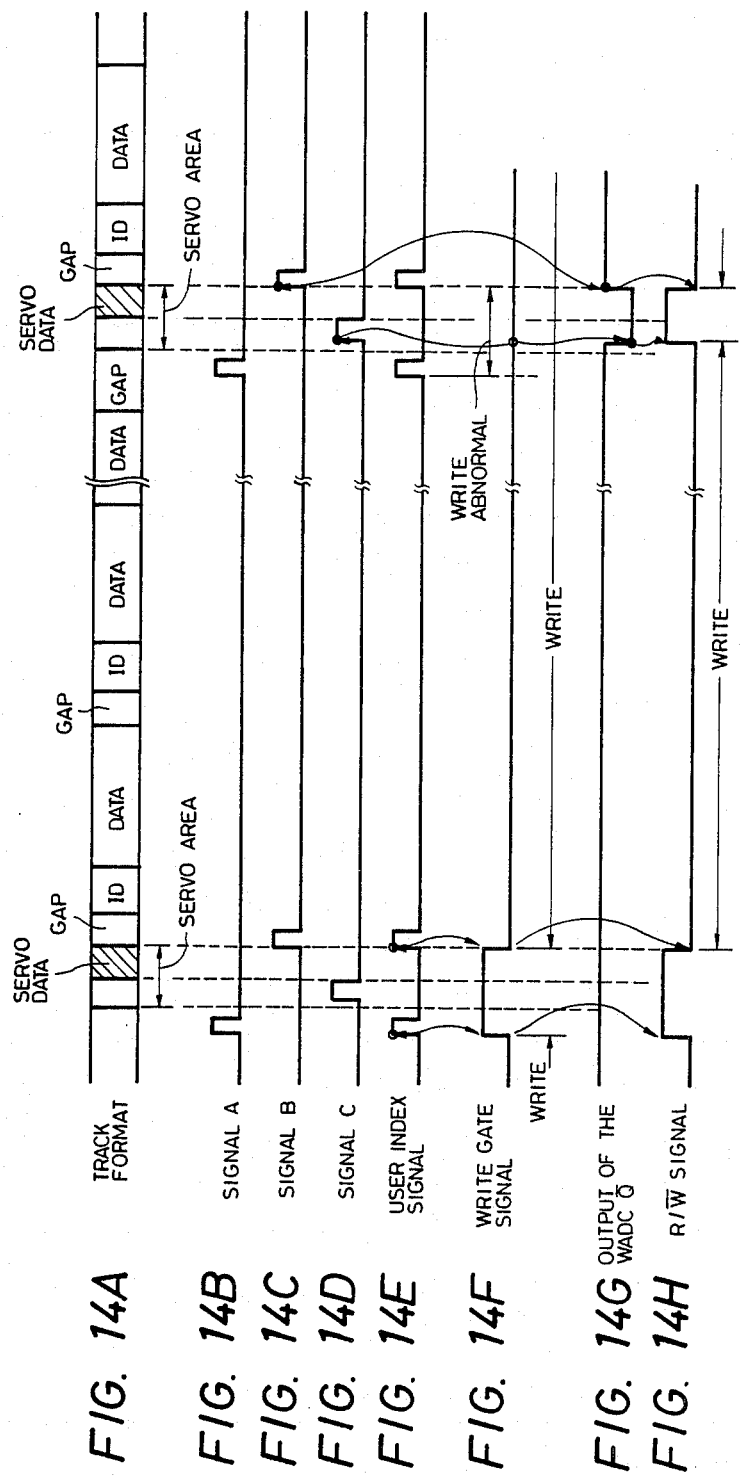
FIGS. 14A to 14H are waveform charts showing the respective waveforms of signals produced by components of the magnetic disk drive system of FIG. 12.

Upon the passage of a head 3 through a servo area 4, the flip-flop circuit 32 is reset by the signal B and thereby the write gate signal 42 provided by the disk controller 100 is validated again. A series of the foregoing operations is illustrated by timing charts shown in FIGS. 14A to 14H. FIG. 14A is a schematic illustration of a track format, FIGS. 14B, 14C and 14D show the respective waveforms of the signals A, B and C, respectively, FIG. 14E shows the waveform of the user index signal given to the disk controller 100, FIG. 14F shows the waveform of the write gate signal, and FIGS. 14G and 14H show the respective waveforms of the $\overline{Q}$ output of the WADC 30 and a R/W control signal for controlling the read/write amplifier 12, respectively. In the drawings, write abnormal has occurred in the right-hand servo area, the $\overline{Q}$ output of the WADC has changed to low, and the R/W control signal has changed to high. Thus, the read/write amplifier 12 is set by the R/W control signal so as to inhibit write operation before the servo data is destroyed even if the write gate signal 42 of the disk controller 100 becomes active (low) during a period corresponding to the servo area.

Although the servo data protection has been described with reference to the waveforms showing a case in which write abnormal occurred in the format write mode, the components of the third embodiment function in the same manner in a case of faulty setting of the disk controller 100 for the number of bytes of write data, which also could destroy the servo data.

Figure 15:
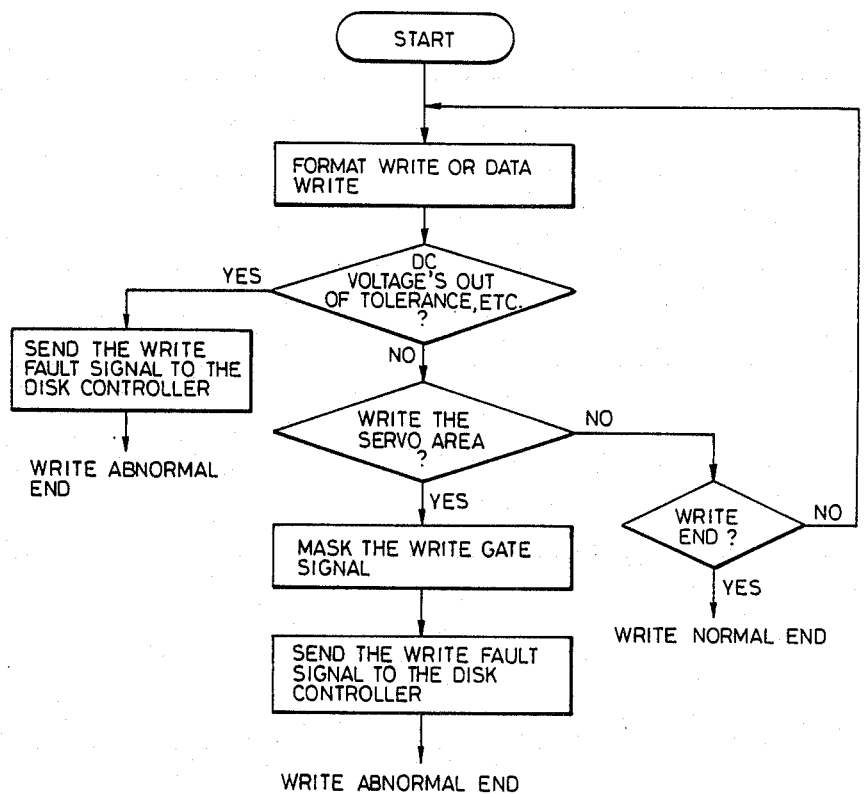
FIG. 15 is a flow chart showing the general operation of the magnetic disk drive system of FIG. 12.

A series of steps of the foregoing process executed by the magnetic disk apparatus 1' is illustrated by the flow chart in FIG. 15. Since the contents of the process are readily understandable from the flow chart, detailed description thereof is omitted.

Figure 16:
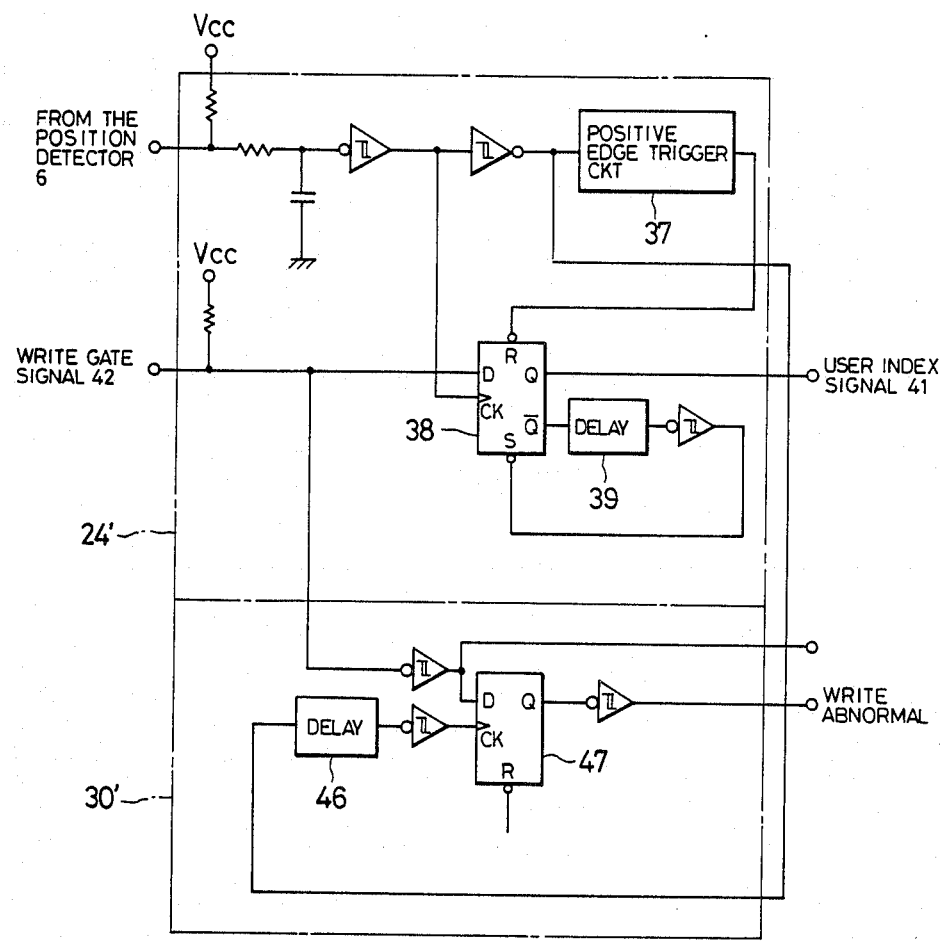
FIG. 16 is a block diagram showing the respective circuitry of modifications of the user index signal producing circuit and the write abnormal detect circuit of the magnetic disk drive system of FIG. 12.

FIG. 16 shows the respective modifications of the user index generating circuit and the WADC of the third embodiment. In FIG. 16, indicated at 24' is a user index generating circuit and at 30' is a WADC (write abnormal detect circuit). The signal produced by a position detector 6 becomes low in an area corresponding to the servo area in the this modification, in that of the second embodiment (FIG. 6). This signal is applied through a RC filter and a Schmitt trigger inverter to the clock terminal CK of a flip-flop circuit 38, and through another Schmitt trigger inverter to a positive edge trigger circuit 37. Upon the detection of the leading edge of the input signal, namely, the index signal, positive edge trigger circuit 37 produces a negative pulse. This pulse is applied to the reset terminal (R) of the flip-flop circuit 38.

On the other hand, the write gate signal 42 is applied to the data input terminal (D) of the flip-flop circuit 38. The flip-flop circuit 38 is triggered by the trailing edge of the index signal to latch the write gate signal 42 and produces a user index signal at the output terminal Q. The inverted output terminal $\overline{Q}$ of the flip-flop circuit 38 is connected through a delay circuit 39 and a Schmitt trigger inverter to the set terminal S. Thus, the the write gate signal 42, latched by the flip-flop circuit 38 and using the trailing edge of the index signal as a trigger, is set by the leading edge of the inverted output ($\overline{Q}$ output). When the level of the $\overline{Q}$ output is changed to high by the trailing edge of the index signal, the flip-flop circuit is set after a predetermined time.

Thus, the user index signal 41 is always provided at the moment corresponding to the leading edge of the index signal, and the user index signal is provided at the moment corresponding to the trailing edge of the index signal only when the level of the write gate signal 42 is low.

The WADC 30' comprises, as principal components, a flip-flop circuit 47 which receives the write gate signal 42 at the data input terminal D through a Schmitt trigger inverter, and a delay circuit 46. The index signal is delayed by a predetermined time by the delay circuit 46. That is, the trailing edge of the index signal is delayed by a predetermined time to latch the write gate signal 42 a moment after the start of the servo area 4, and then the write gate signal 42 is provided at the output terminal Q of the flip-flop circuit 46. When the level of the write gate signal 42 is low, the write gate signal 42 is provided as a write abnormal signal. The rest of the constitution and functions are the same as those of the third embodiment shown in FIG. 12.

Figure 17:
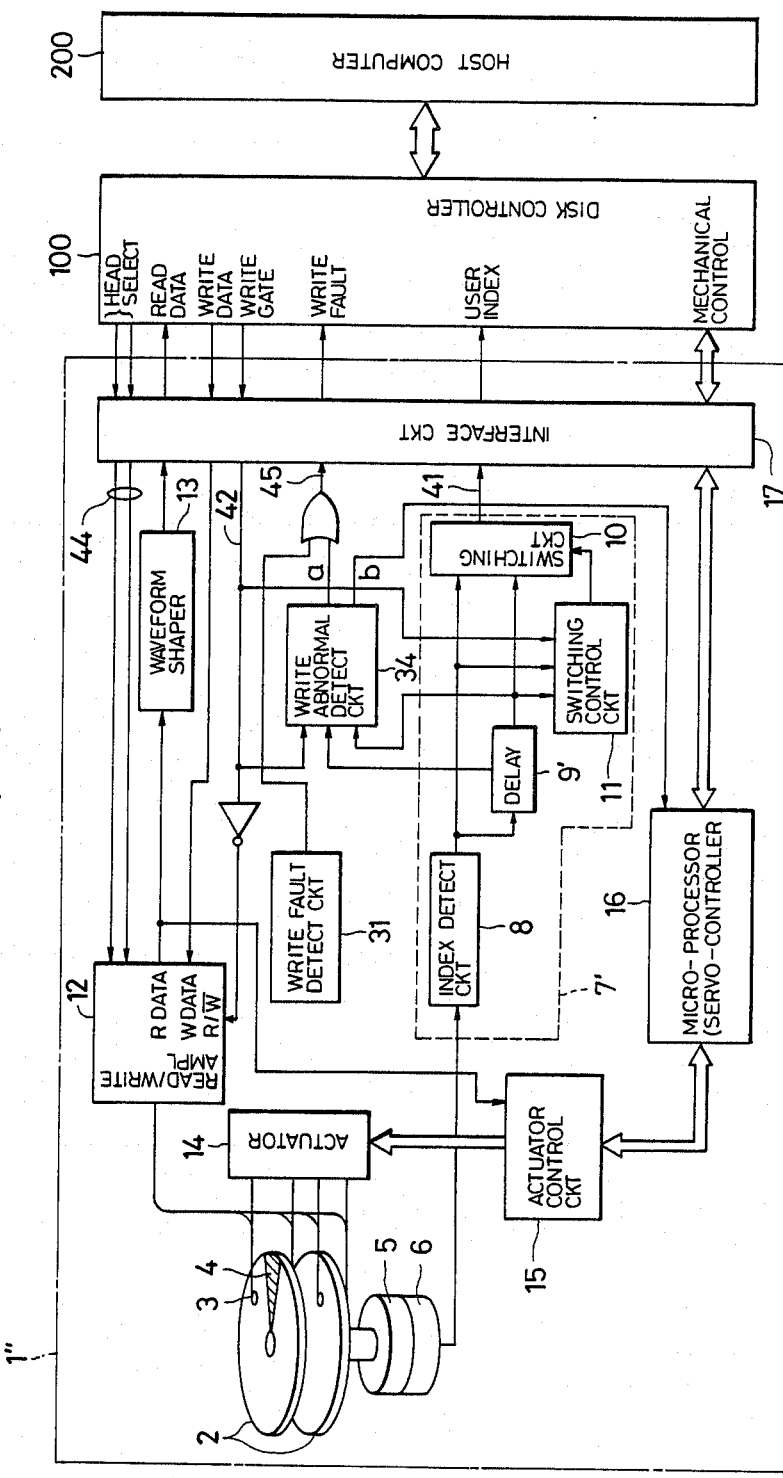
FIG. 17 is a block diagram showing a magnetic disk drive system including a magnetic disk apparatus, in a fourth embodiment, according to the present invention.

A fourth embodiment of the present invention will be described hereinafter with reference to FIGS. 17 to 20, in which the same parts as those previously described with reference to FIG. 12 are denoted by the same reference numerals. A magnetic disk apparatus employed in the fourth embodiment also is provided with a write abnormal detect circuit. In FIG. 17, indicated at 34 is a write abnormal detect circuit. An output a of the write abnormal detect circuit 34 is sent as a write fault signal 45, together with a signal provided by a write fault detect circuit 31, to a disk controller 100. An output b of the write abnormal detect circuit 34 is given to a microprocessor 16 to inform the microprocessor 16 of the abnormal operation of the disk controller 100 and to register the position of write abnormal. If the relevant servo data is destroyed, the destroyed servo data is not used thereafter, and servo data of the adjacent track is used in place of the destroyed servo data. Generally, the microcomputer 16 stores the servo data of the adjacent track in a memory incorporated therein.

Figure 18:
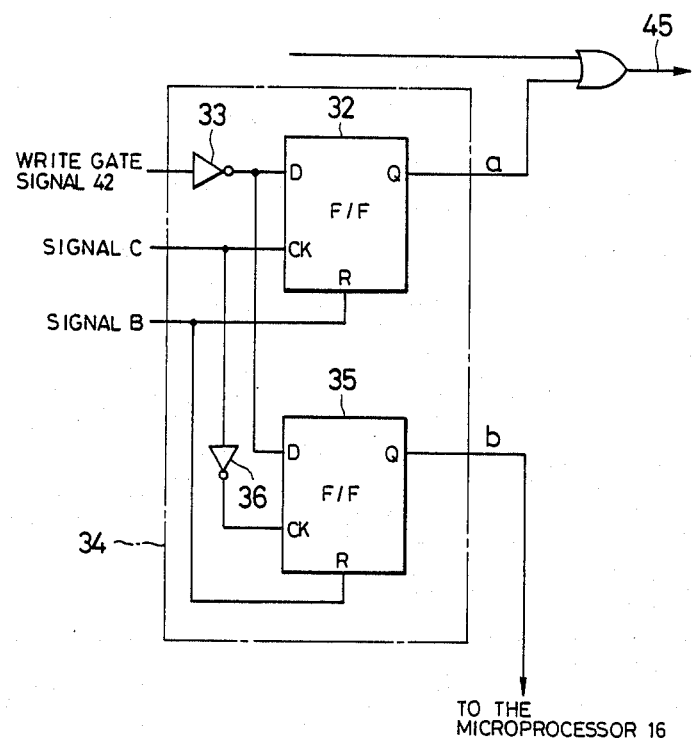
FIG. 18 is a block diagram showing a write abnormal detect circuit employed in the magnetic disk drive system of FIG. 17.
Figure 19:
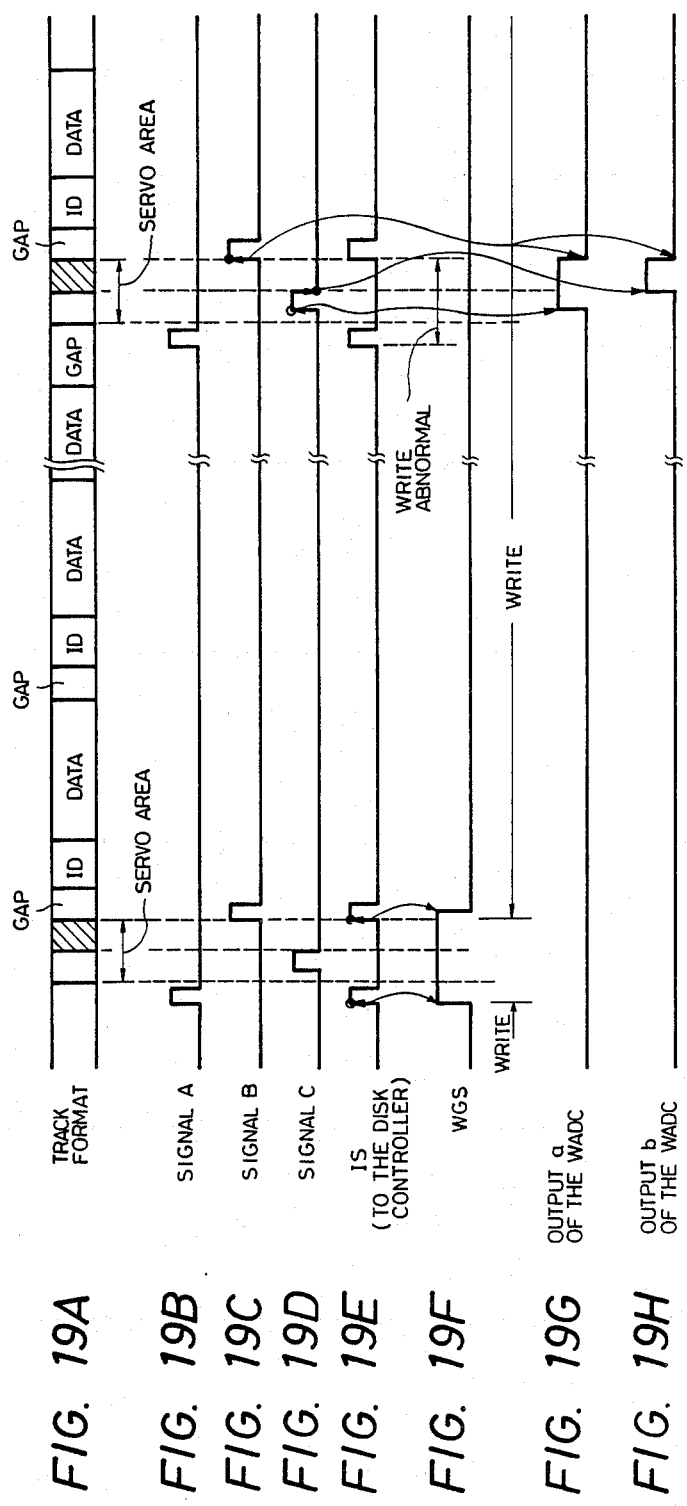
FIGS. 19A to 19H are waveform charts showing the respective waveforms of signals produced by components of the magnetic disk drive system of FIG. 17.

Referring to FIG. 18 showing the write abnormal detect circuit 34 in detail, the write abnormal detect circuit 34, similarly to the write abnormal detect circuit 30 shown in FIG. 13, generates the output a by means of a flip-flop circuit 32 and an inverter 33, and the output b by means of a flip-flop circuit 35 and an inverter 36. A signal produced when inverter 33 inverts the write gate signal 42, produced by a disk controller 100, is applied to the data input terminal D of the flip-flop circuit 32, while a signal produced by inverting the signal C by the inverter 36 is applied to the clock input terminal CK of the flip-flop circuit 32. The trailing edge of the signal C corresponds to the start of servo data. A decision is made as to whether or not the servo data has been destroyed by sampling the signal produced by inverting the write gate signal 42, using the trailing edge of the signal C as a trigger. The signal B is applied to the reset terminal R of the flip-flop circuit 35.

FIGS. 19A to 19H depicts, similarly to FIGS. 14A to 14H, the timing of operation of the write abnormal detect circuit 34. The track format and waveforms shown in FIGS. 19A to 19F are the same as those shown in FIGS. 14A to 14F, respectively. FIGS. 19G and 19H show the waveforms of the outputs a and b of the write abnormal detect circuit 34. In this embodiment, a signal produced by inverting the signal C is applied to the clock input terminal of the flip-flop circuit 35, however, a timing signal indicating the start of another servo data may be applied to the clock input terminal of the flip-flop circuit 35 for the same effect.

Although the fourth embodiment has been described with reference to a case in which write abnormal occurred in the format write mode, naturally, the fourth embodiment is able to deal with a case in which write abnormal occurs in the data write mode.

Figure 20:
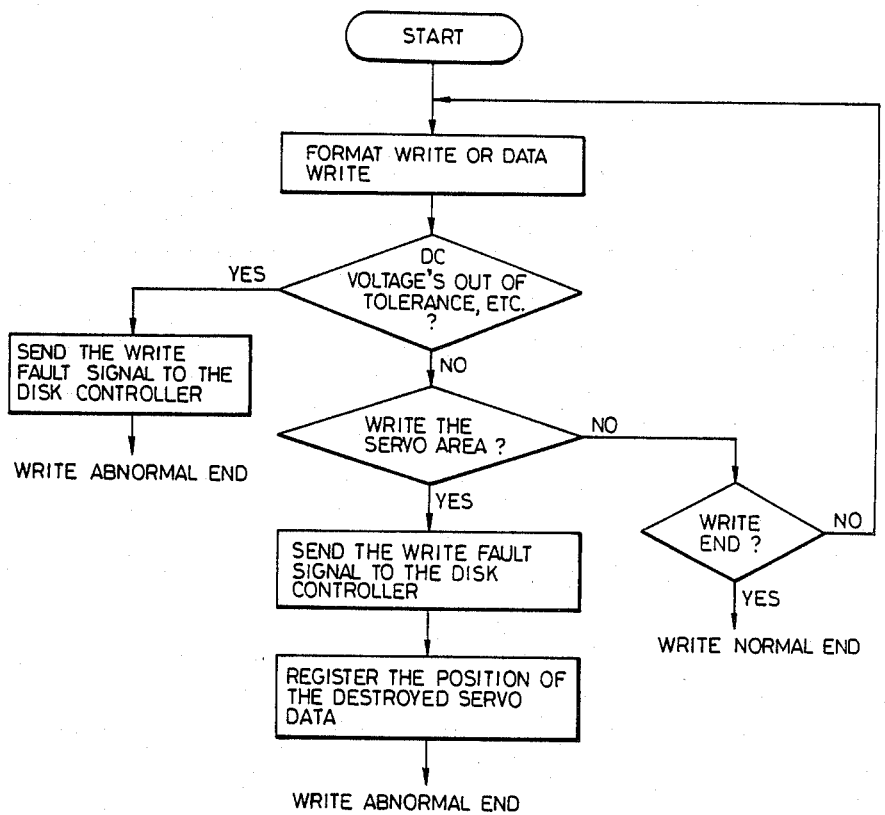
FIG. 20 is a flow chart showing the general operation process of the magnetic disk drive system of FIG. 17.

FIG. 20 is a flow chart showing the general procedure of operation of a magnetic disk apparatus 1" employed in the fourth embodiment, which is different from the manner of operation of the magnetic disk apparatus of the foregoing embodiment. As is obvious from FIG. 20, the position of destroyed servo data can be registered in a microprocessor 16 without modifying a R/W control signal for controlling a read/write amplifier 12.

Although the third and fourth embodiments have been described as each having a write abnormal detect circuit in addition to the components of the first embodiment, naturally, the circuit of the second embodiment shown in FIG. 6 may be provided additionally with a write abnormal detect circuit. In such a case, since a write fault detect circuit 31 is included in the ST506 employed as an interface circuit 17, the circuit needs some modification, which is obvious to those skilled in the art and hence the description thereof will be omitted.

Thus, in the third and fourth embodiment, when the disk controller executes a faulty control operation causing write abnormal in the servo data area due to setting the disk controller for faulty software or the like, write abnormal is detected and the disk controller and the host computer are informed of write abnormal, so that measures are taken to deal with write abnormal, which improves the reliability of the system remarkably. Furthermore, impediment of the following servocontrol can be prevented by forcibly interrupting write abnormal in the magnetic disk apparatus to protect the servo data or by registering the position of the destroyed servo data in the servo microcomputer.

As is apparent from the foregoing description of the preferred embodiments, in the disk drive system according to the present invention the process time of the format write mode can be remarkably reduced without adding additional circuit elements to the circuit of the disk controller by selectively using the user index signals applied from the disk apparatus to the disk controller according to the operating mode of the disk apparatus. Furthermore, since the disk apparatus is able to discriminate independently the mode of operation designated by the host computer by means of the write gate signal, the disk apparatus is able to cope independently with write abnormal to protect the servo data without delay, even when write abnormal is caused by abnormal operation of the disk controller.

What is claimed is:

1. A disk apparatus for use in a disk drive system having a disk controller which provides control signals on the basis of commands given thereto from a host computer to control the mode of operation of said disk apparatus in writing data on and reading data from tracks on the data surface of a rotary disk, the tracks including a servo area for servo data, said disk apparatus comprising:

read/write means for reading data from and writing data on the tracks on the data surfaces of rotary disks;
   control means for accurately positioning said read/write means on a predetermined track in accordance with servo data written in the servo area on the data surface of the disk; phase detecting means responsive to rotation of the disk for detecting the angular phase of the disk; and signal selecting and sending means for selectively sending to the disk controller a first signal indicating the start of the servo area of the disk and a second signal indicating the end of the servo area of the disk, in accordance with the output signal of said phase detecting means and control signals from the disk controller.

2. A disk apparatus according to claim 1, wherein said signal selecting and sending means sends the first signal and the second signal when the control signals indicate the disk drive system is operating in a format write mode, and sends the second signal when the control signals indicate the disk drive system is operating in a mode other than the format write mode.

3. A disk apparatus according to claim 2, wherein said signal selecting and sending means includes discriminating means which selects between the format write mode and the other modes of operation on the basis of a write control signal sent from the disk controller to said disk apparatus.

4. A disk apparatus according to claim 3, wherein said discriminating means selects between the format write mode and the other modes by detecting the level of the write control signal after a predetermined time has passed following the second signal .

5. A disk apparatus according to claim 1, further comprising means for detecting the level of a write control signal from the disk controller to said disk apparatus after a predetermined time has passed following the first signal and for forcibly invalidating the write control signal when the level of the write control signal corresponds to a write level.

6. A disk apparatus according to claim 1, further comprising means for detecting the level of a write control signal from the disk controller to said disk apparatus after a predetermined time has passed following the first signal, and for sending information representing a write abnormal condition to said disk controller when the level of the write control signal corresponds to a data write level.

7. A disk apparatus for writing write data on the data surfaces of rotary disks according to a write control signal given thereto from a disk controller, each of the rotary disks having a data surface with a plurality of tracks thereon, the tracks including a servo area for servo data said disk apparatus comprising:

rotative means for rotating rotary disks;

writing means for writing write data on the disks;

positioning means for accurately positioning said writing means on a predetermined track of a disk in accordance with servo data stored in the servo area on the data surface of the disk;

signal generating means responsive to the angular phase of the disk for generating a first index signal indicating the start of the servo area and a second index signal indicating the end of the servo area; and mode detecting means for detecting a format write mode of operation in accordance with the level of the write control signal provided by the disk controller a predetermined time following either of said index signals.

8. A disk apparatus according to claim 7, further comprising index signal sending means for sending the index signals to the disk controller upon detection of the format write mode by said mode detecting means.

9. A disk apparatus according to claim 8, wherein said index signal sending means is responsive to said mode detecting means detecting a mode of operation other than the format write mode to send only the second index signal.

10. A disk apparatus according to claim 7, further comprising write abnormal detecting means for detecting a write abnormal condition in accordance with the level of the write control signal a predetermined time following the first index signal.

11. A disk apparatus according to claim 10, further comprising means for invalidating the write control signal upon the detection of the write abnormal condition by said write abnormal detecting means.

12. A disk apparatus according to claim 11, further comprising write abnormal signal sending means for sending a write abnormal signal to the disk controller upon the detection of the write abnormal condition by said write abnormal detecting means.

13. A disk driving method for a disk drive system including a disk apparatus, and a disk controller which controls the mode of operation of the disk apparatus on the basis of commands given thereto from a host computer, to read data from and to write data on tracks on the data surface of a rotary disk in accordance with servo data written in servo areas formed on the data surface of the rotary disk, said method comprising steps of:

receiving write data and a write control signal from the disk controller;

detecting the angular phase of the disk;

generating a first index signal and a second index signal indicating, respectively, the start and the end of the servo area in accordance with the detected angular phase of the disk;

detecting the mode of operation of the disk apparatus in accordance with the received write control signal and the index signals; and selectively sending the index signals to the disk controller in accordance with the detected mode of operation.

14. A disk driving method according to claim 13, further comprising applying the index signals to the disk controller when the detected mode of operation is a format write mode.

15. A disk driving method according to claim 14, further comprising applying the second index signal to the disk controller when the detected mode of operation is a mode other than the format write mode.

16. A disk driving method according to claim 13, further comprising detecting a write abnormal condition in accordance with the level of the write control signal during a period between the first index signal and the second index signal.

17. A disk driving method according to claim 13, further comprising sending a write fault signal to the disk controller when the write abnormal condition is detected.

* * * * *